US009963209B2

(12) United States Patent
O'Connell et al.

(10) Patent No.: US 9,963,209 B2
(45) Date of Patent: May 8, 2018

(54) SHARK BARRIER

(71) Applicant: Stellenbosch University, Stellenbosch (ZA)

(72) Inventors: Craig Patrick O'Connell, Stormville, NY (US); Michael Rutzen, Gansbaai (ZA); Sara Andreotti, Gansbaai (ZA); Conrad Matthee, Stellenbosch (ZA)

(73) Assignee: Stellenbosch University, Stellenbosch (ZA)

( * ) Notice: Subject to any disclaimer, the term of this patent is extended or adjusted under 35 U.S.C. 154(b) by 145 days.

(21) Appl. No.: 14/647,646

(22) PCT Filed: Nov. 27, 2013

(86) PCT No.: PCT/IB2013/060446
§ 371 (c)(1),
(2) Date: May 27, 2015

(87) PCT Pub. No.: WO2014/083514
PCT Pub. Date: Jun. 5, 2014

(65) Prior Publication Data
US 2015/0321737 A1 Nov. 12, 2015

(30) Foreign Application Priority Data

Nov. 27, 2012 (ZA) .................................. 2012/08933
Dec. 21, 2012 (ZA) .................................. 2012/09727

(51) Int. Cl.
*A01K 61/00* (2017.01)
*B63C 9/05* (2006.01)
*A01K 79/02* (2006.01)
*A01K 61/70* (2017.01)
*E02B 3/04* (2006.01)

(52) U.S. Cl.
CPC ................ *B63C 9/05* (2013.01); *A01K 61/70* (2017.01); *A01K 79/02* (2013.01); *E02B 3/043* (2013.01); *Y02A 40/83* (2018.01)

(58) Field of Classification Search
CPC ........ A01K 61/006; A01K 79/02; B63C 9/05; B63C 2009/0088; E02B 3/04; E02B 3/043; E02B 3/046
USPC .................................................. 119/219, 220
See application file for complete search history.

(56) References Cited

U.S. PATENT DOCUMENTS

| 2,146,105 A * | 2/1939 | Baker .................... A01K 79/02 |
| | | 119/220 |
| 4,950,104 A | 8/1990 | Streichenberger |
| 5,884,585 A | 3/1999 | Streichenberger |
| 6,056,476 A | 5/2000 | Streichenberger |
| 6,060,153 A | 5/2000 | McNeil |
| 6,244,218 B1 | 6/2001 | McNeil |

(Continued)

*Primary Examiner* — Trinh T Nguyen
(74) *Attorney, Agent, or Firm* — The Webb Law Firm

(57) ABSTRACT

A shark barrier includes a plurality of resiliently flexible, elongate members that extend in a generally upright condition between a sea floor and a sea surface. The elongate members are arranged so as to have the appearance of a thicket, preferably a kelp forest, when viewed from within the water and include magnets to assist in deterring certain shark species. The elongate members may be secured to the sea floor by an anchoring base and are held in the generally upright condition by a buoy or buoyant material held within the elongate members.

20 Claims, 4 Drawing Sheets

(56) References Cited

U.S. PATENT DOCUMENTS

| | | | | |
|---|---|---|---|---|
| 6,388,949 B1 * | 5/2002 | Lenhardt | ............... | A01K 79/02 |
| | | | | 116/22 A |
| 7,302,905 B1 * | 12/2007 | Wynne | ............... | B63C 9/00 |
| | | | | 114/343 |
| 8,691,253 B1 * | 4/2014 | Tracy | ............... | A01N 25/34 |
| | | | | 208/22 |
| 9,084,415 B2 * | 7/2015 | Stroud | ............... | A01K 75/00 |
| 2007/0004297 A1 * | 1/2007 | Wynne | ............... | A63C 5/03 |
| | | | | 441/74 |
| 2010/0071631 A1 * | 3/2010 | Vinano, Jr. | ............... | A01K 79/02 |
| | | | | 119/220 |
| 2011/0094451 A1 * | 4/2011 | Ward | ............... | A01K 79/02 |
| | | | | 119/220 |
| 2013/0139428 A1 * | 6/2013 | Smith | ............... | A01K 79/02 |
| | | | | 43/17.1 |
| 2013/0314044 A1 * | 11/2013 | Bahadik | ............... | H02J 7/1415 |
| | | | | 320/114 |
| 2017/0008604 A1 * | 1/2017 | Buster | ............... | A01K 79/02 |

* cited by examiner

SHARK BARRIER

CROSS-REFERENCE TO RELATED APPLICATIONS

This application is the United States national phase of International Application No. PCT/IB2013/060446 filed Nov. 27, 2013, and claims priority to South African Patent Application Nos. 2012/08933 and 2012/09727 filed Nov. 27, 2012 and Dec. 21, 2012, respectively, the disclosures of which are hereby incorporated in their entirety by reference.

FIELD OF THE INVENTION

This invention relates to a barrier for preventing sharks from accessing designated areas.

BACKGROUND TO THE INVENTION

Sharks have been swimming the world's oceans for millions of years and play a vital role in managing healthy ecosystems. The majority of shark species prey on fish and smaller aquatic life such as mollusks and clams, however, bigger species of sharks generally feed on larger animals such as sea lions, seals and bigger fish.

Sharks have fallen victim to a reputation as fierce man-hunting predators and over the years various cases of shark attacks on humans have been documented.

In order to combat shark attacks, coastlines and beaches are often safeguarded with anti-shark devices to prevent sharks from entering the enclosed swimming areas. Various different anti-shark devices have been used including shark nets, drum lines and exclusion nets.

Shark nets are large-meshed nets designed to entangle and catch sharks, thereby reducing the population thereof within the vicinity of enclosed beaches. These nets are typically secured at two ends by anchors and laid submerged in two parallel rows a few hundred meters offshore and in water depths of approximately 10 to 14 meters. Although fairly effective, shark nets do not form a complete barrier and sharks can swim over, under or around the nets. It is therefore not uncommon for sharks to be found on the shore-side of shark nets and many of these are then often caught in the nets when leaving the protected area. In addition to this, other aquatic creatures such as turtles and dolphins are often caught and killed in the nets.

Drum lines are often used in addition to shark nets and are also designed to attract and capture sharks with baited hooks, rather than to form a barrier between bathers and sharks.

Exclusion nets have smaller mesh sizes and create a physical barrier beyond which sharks, and many other aquatic creatures, cannot pass. They extend vertically from the sea floor to just below the surface. Although exclusion nets are not designed to capture sharks and are therefore generally less detrimental to the environment, the nets are not suitable for certain high-swell regions and are impractical for protecting large areas.

SUMMARY OF THE INVENTION

In accordance with this invention, there is provided a shark barrier comprising a plurality of resiliently flexible, elongate members extending in a generally upright condition between a sea floor and a sea surface, the elongate members arranged so as to have the appearance of a thicket when viewed from below the sea surface.

Further features of the invention provide for the elongate members to be arranged so as to resemble a kelp forest; for one or more magnets to be associated with at least some of the elongate members; and for each of the elongate members to be provided with at least one magnet. The resiliently flexible, elongate members are arranged in a plurality of parallel rows, wherein each row includes at least three flexible, elongate members, and the plurality of parallel rows are staggered with respect to each other.

Still further features of the invention provide for the barrier to be secured to the sea floor by at least one anchoring base; for each of the elongate members to be secured to the sea floor by a separate anchoring base; and for the elongate members to be movably secured to the respective anchoring bases, preferably using hinges, ropes or chains.

Yet further features of the invention provide for the barrier to be secured to a buoy on the sea surface; and for each elongate member to be secured to a buoy at or near an upper part thereof.

Still further features of the invention provide for at least some of the elongate members to be articulated along their length; for the articulation to be effected by segmenting a member into at least two segments; and for the segments to be connected to each other by a hinge, rope or chain.

In one embodiment of the invention, the elongate members comprise tubes made from a buoyant material, preferably a foam material; and for the anchoring bases to be cement blocks, preferably built into tyres.

In an alternative embodiment, the elongate members comprise tubes, preferably made from a plastics material, which are at least partially filled with a buoyant material, preferably a foam material.

A further feature of the invention provides for the magnets to be secured within the tubes.

Further features of the invention provide for the buoyant foam to be a high density foam and for the magnets to be Barium-Ferrite magnets.

BRIEF DESCRIPTION OF THE DRAWINGS

The invention will now be described, by way of example only with reference to the accompanying representations in which.

DETAILED DESCRIPTION WITH REFERENCE TO THE DRAWINGS

Figure 1:
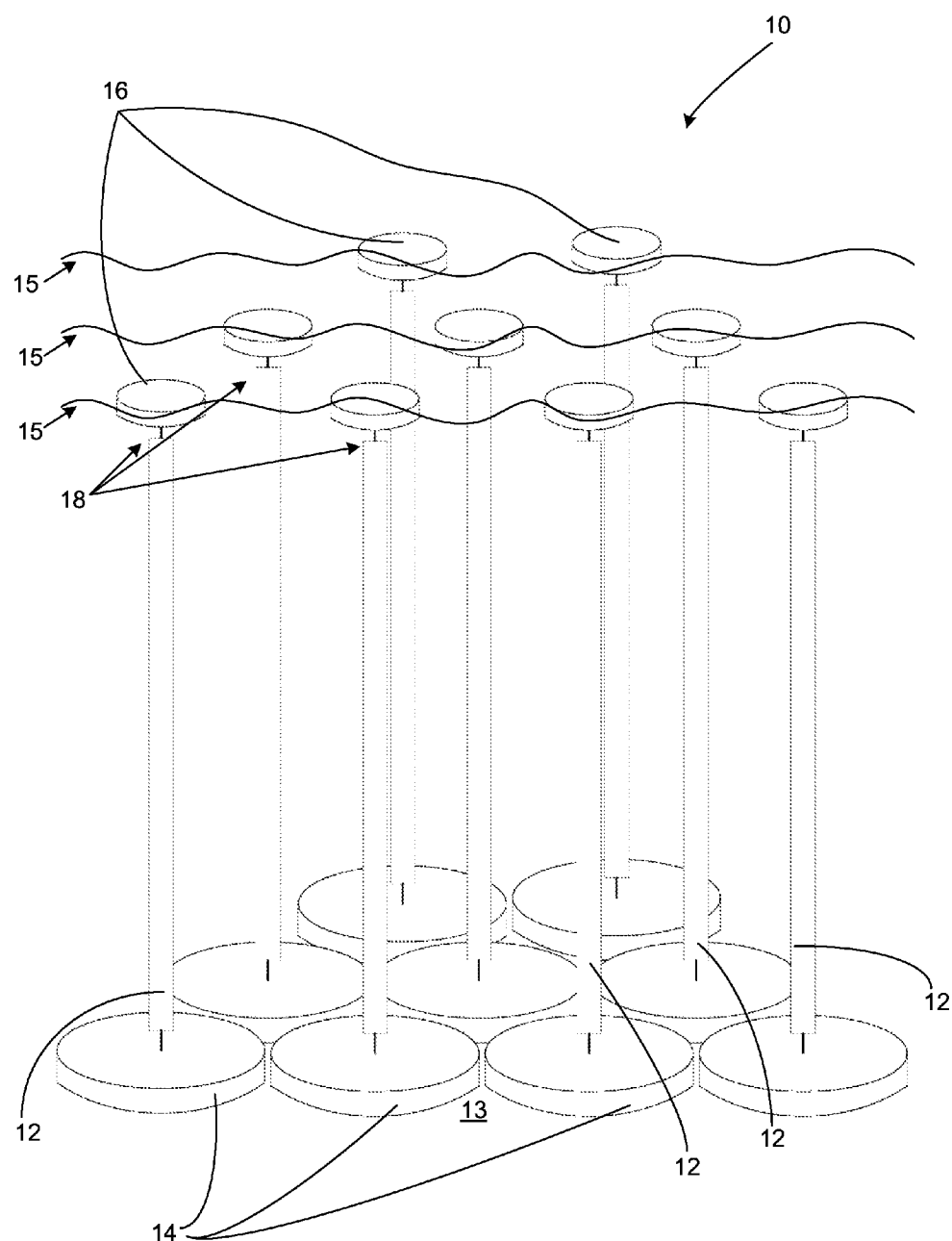
FIG. 1 illustrates a three-dimensional view of one embodiment of a barrier in accordance with the invention.
Figure 3:
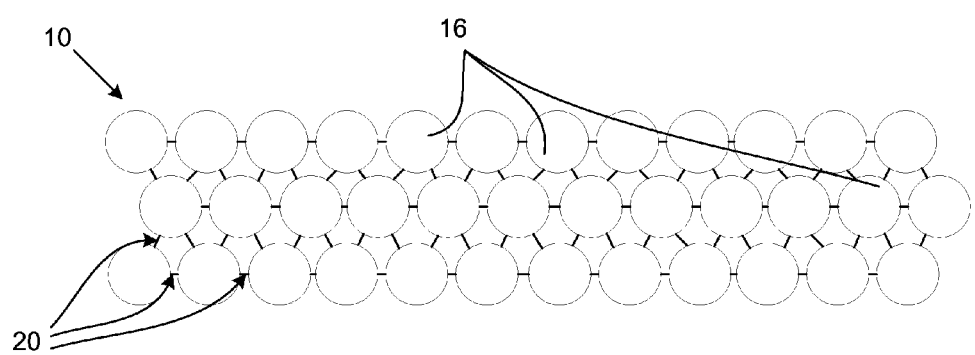
FIG. 3 illustrates a top view showing an array of anchored members forming a barrier in accordance with the invention.

A shark barrier (10) is shown in FIG. 1 and includes a plurality of resiliently flexible, elongate members (12) each anchored to a sea floor (13) by means of an anchoring base (14) and extending in a generally upright position towards the sea surface (15). The elongate members (12) are arranged so as to have the appearance of a thicket when viewed from within the water, below the sea surface (15). In order to ensure that the elongate members (12) extend in the generally upright position, a buoy (16) is secured to each member (12) at its upper ends (18). The buoys (16) can be loosely secured together by ropes (20) to prevent the members (12) moving too far apart and so to assist in maintaining the appearance of a thicket, as shown in FIG. 3.

Figure 2:
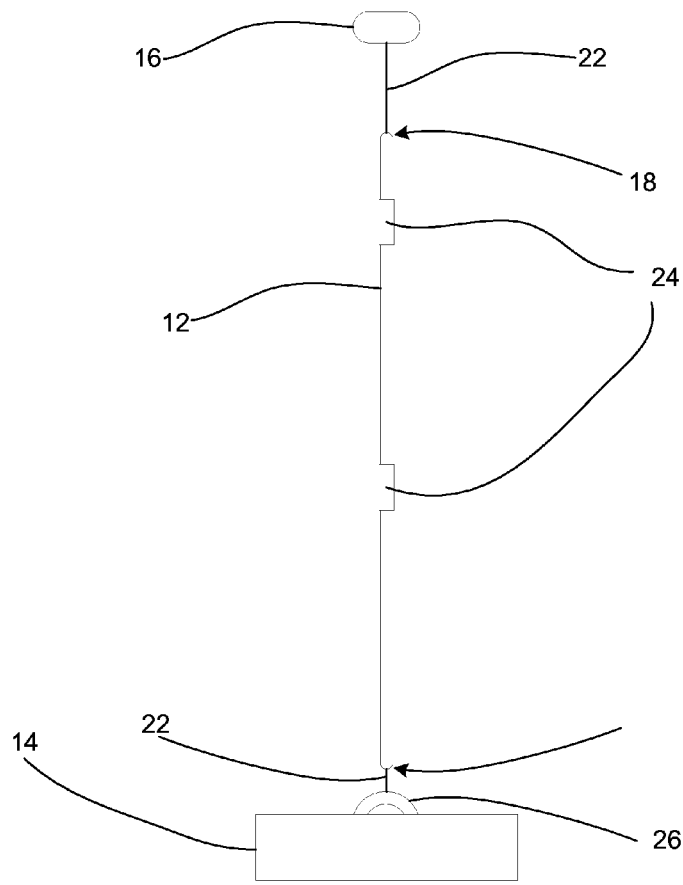
FIG. 2 illustrates a three-dimensional view of a first embodiment of an anchored elongate member which forms part of the barrier illustrated in FIG. 1.

Referring also to FIG. 2, the elongate members (12) are each provided by a length of a foamed plastics material having a cylindrical cross-section. A chain (22) extends axially through each member (12) and is secured at either end to an anchoring base (14) and buoy (16). The elongate members (12) move with the prevailing current and swell and thus have the appearance of a natural kelp forest.

Research has indicated that kelp forests deter certain species of sharks and it has been shown that sharks tend to avoid entering into kelp forests. Cape fur seals have been observed to hide in kelp forests until it is safe to leave and kelp forests are also commonly used by divers to avoid shark attacks The appearance of the barrier (10) alone has thus been found to be effective in deterring sharks from entering the barrier (10).

The barrier (10) will typically be arranged to protect a beach or similar bathing area and may thus be fairly long. To maintain the appearance of a kelp forest it should have at least three, preferably four or more, elongate members (12) in its width. These should be staggered and not form uniform, orthogonal rows in the width of the barrier. Rather, a staggered or random placing which imitates natural kelp growth is aimed for insofar as possible. Sharks will normally approach at some angle to the length of the barrier (10) and hence the width of the barrier (10) should present a thicket view to an approaching shark.

The buoys (16) assist in maintaining the upper ends (18) of the elongate members (12) near the sea surface (15). They thus prevent a gap being formed between the ends of the members (12) and sea surface (15) in strong currents which tend to bend the members (12). If such a gap formed sharks may be able to swim over the barrier (10).

Also in this embodiment, a pair of magnets (24) are secured to each elongate member (12) spaced apart along its length. Research suggests that magnets deter at least some species of sharks, including great white sharks, bull sharks, tiger sharks and great hammerhead sharks, and rays. The magnets exploit the sensitivity of the Ampullae of Lorenzini in sharks by over-stimulating the sharks' electro-sensory systems. The Ampullae of Lorenzini is not found on bony fish species, thus ensuring that the magnets will not repel such fish species. The magnets (24) thus act as a further deterrent and are particularly useful for deterring shark species which may not find kelp forests a large deterrent of themselves.

Barium-Ferrite magnets have been found to perform well in this role.

Figure 4:
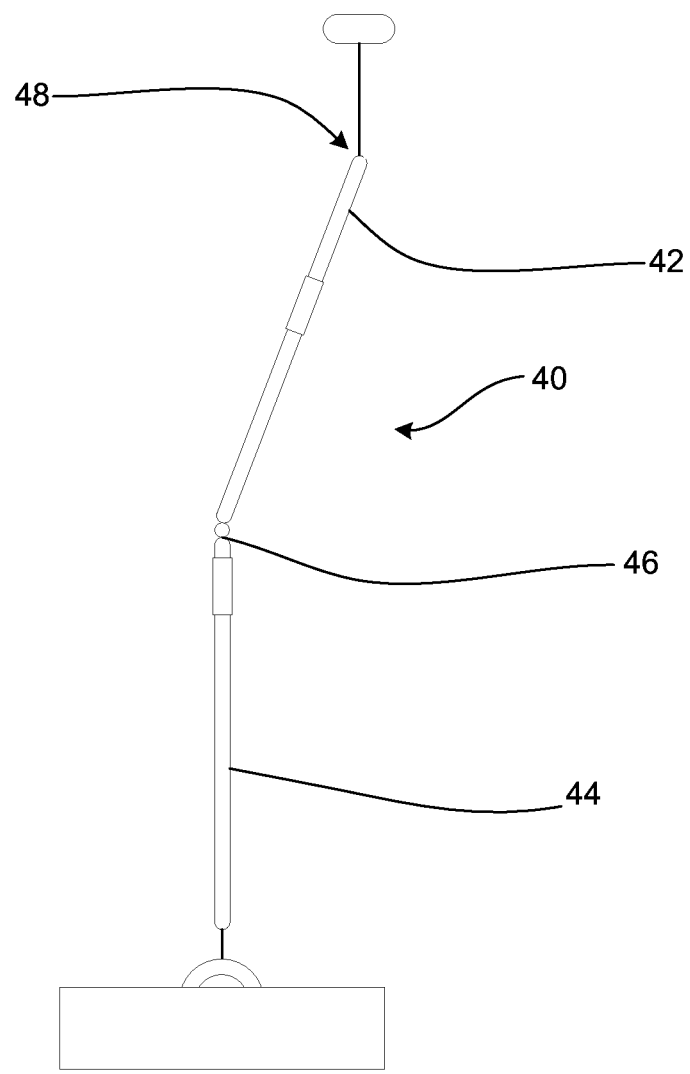
FIG. 4 illustrates a three-dimensional view of a second embodiment of an anchored elongate member.

It will be appreciated that the elongate members (12) can be made of any suitable material and can have any suitable configuration. As shown in FIG. 4, each elongate member (12) can be articulated along its length. In this embodiment each elongate member (40) is divided into two segments (42, 44) which are secured together by a length of chain (46) and allows the segments (42, 44) to pivot relative to each other. The articulation permits the segments (42, 44) to move partially autonomously under action from water currents and results in a generally more upright orientation, or rather less bent orientation, of the members (40) in oceanic currents. This in turn assists in maintaining the upper ends (48) near the surface of the sea.

Figure 5:
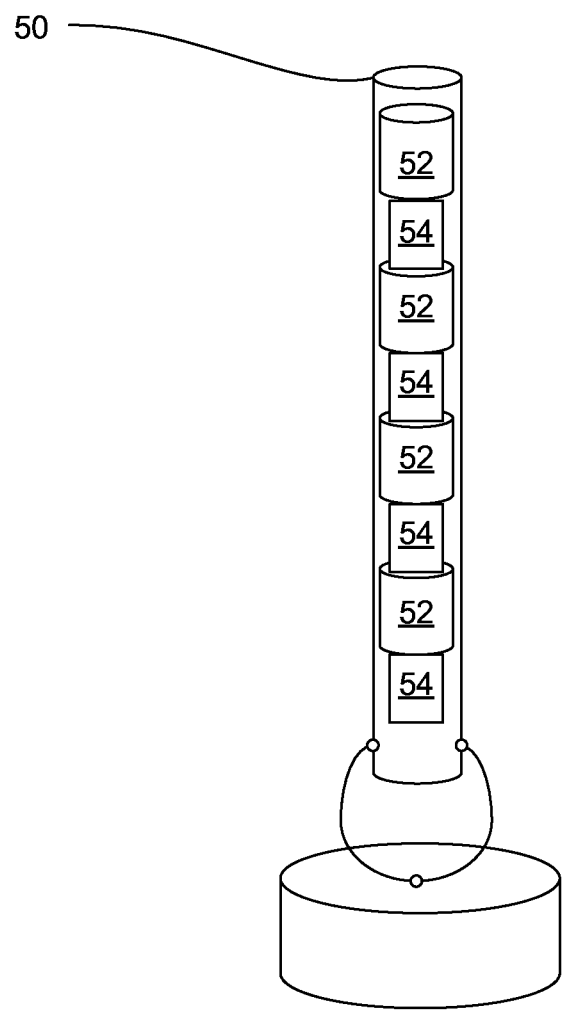
FIG. 5 illustrates a sectional three-dimensional view of a third embodiment of an anchored elongate member.

Also in this embodiment, each elongate member (40) is provided by a tube made of a plastics material. Polyvinylchloride (PVC) has been found to work well, particularly as algae grows well on it. Thus the barrier assumes a very natural appearance after a length of time sufficient for algae to cover the members (40). Of course any suitable plastics material can be used.

Where tubes are used for the elongate members, these could be filled with buoyant material. Foamed plastics material, preferably a high density foam, has been found to be particularly suitable and to provide added buoyancy and strength. The buoyant material, particularly where foam is used, could be provided in sections which are simply pressed into each tube (50). These foamed sections (52) could be alternated with magnets (54) along the length of each tube as shown in FIG. 5. A spacing of about 1 m between magnets (52) has been found to work very well, but any suitable spacing could be used. Also, it is not necessary to provide each elongate member with magnets (54). Rather a selected number could be provided with magnets, for example the first row or even alternating elongate members of the first row.

The buoyant material inserts (52) may have a bore or pockets for receiving the magnets instead of alternating inserts (52) with magnets (54) along the length of the tubes (50).

It will be appreciated that when making use of the high density foam for the buoyant material inserts (52), the type and amount of foam will depend on various factors, including the length and diameter of the plastics tube (50), whether or not magnets (54) are fixed within the plastics tube (50), the amount of magnets (54) fixed within the plastics tube (50), and the salinity of the water.

If the elongate members are sufficiently buoyant this may obviate the need for them to be secured to buoys at their upper ends.

The weight and size of the anchoring base (14) may vary and the base (14) may include a hook or other attachment means (26) for securing it to the elongate members (12, 40, 50). The anchoring base (14) is typically provided by a concrete block, but any suitable material can be used. A concrete block cast into a used vehicle tyre has been found to be particularly useful.

The anchoring bases will preferably also be secured together to limit of prevent individual movement and to provide a more massive anchoring structure.

As previously indicated, the elongate members (12) of the shark barrier (10) are arranged so as to have the appearance of a thicket when viewed from within the water. The elongate members (12) are typically placed adjacent each other and arranged so as to form a thicket-like array having a plurality of rows forming the barrier (10) having both a length and a breadth. In a preferred embodiment of the invention the elongate members (12) are closely spaced apart from each other. The rows may have an interwoven appearance and it is appreciated that the elongate members (12) may be arranged in various different arrays.

The elongate members (12) may be interconnected to each other, preferably by ropes (20), but other suitable attachment means may also be used. Although FIG. 1 shows each of the elongate members (12) secured to an anchoring base (14), a single anchoring base could also be used. Similarly, the elongate members (12) can be secured to a single buoy.

It will be appreciated that it is not necessary to use chains and that any suitable means can be used for securing each elongate member to the anchoring base and buoy, and for permitting the elongate members to articulate. Ropes, hooks, clips, hinges or the like can be used. While it is simple to secure each elongate member over a length of chain or rope, these could of course be secured only to the ends of the elongate members.

The shark barrier of the invention provides an environmentally friendly alternative to anti-shark devices such as shark nets, drum lines or exclusion nets. The shark barrier is strong enough to resist oceanic tidal currents and its characteristics of strongly resembling kelp forests and over-stimulating sharks' electro-sensory systems make it a very effective shark barrier. The barrier is much less detrimental to the ecosystem than exiting barriers as it is not aimed at catching sharks, but rather at deterring them. At the same time it is not detrimental to other aquatic creatures.

The invention claimed is:

1. A shark barrier comprising a plurality of resiliently flexible, elongate members extending in a generally upright condition between a sea floor and a sea surface, wherein the elongate members are arranged so as to have the appearance of a thicket when viewed from below the sea surface, wherein at least some of the elongate members have one or more magnets associated therewith, and wherein the resiliently flexible, elongate members are arranged in a plurality of parallel rows, wherein each row includes at least three flexible, elongate members, and the plurality of parallel rows are staggered with respect to each other.

2. The shark barrier as claimed in claim 1, wherein the elongate members are arranged to resemble a kelp forest.

3. The shark barrier as claimed in claim 1, wherein the elongate members are secured to the sea floor by at least one anchoring base.

4. The shark barrier as claimed in claim 1, wherein each of the elongate members is secured to an anchoring base.

5. The shark barrier as claimed in claim 1, wherein the elongate members are secured to a buoy.

6. The shark barrier as claimed in claim 1, wherein each elongate member is secured to a buoy at or near its upper end.

7. The shark barrier as claimed in claim 4, wherein each elongate member is secured to a buoy at or near its upper end.

8. The shark barrier as claimed in claim 1, wherein at least some of the elongate members are articulated along their length.

9. The shark barrier as claimed in claim 4, wherein at least some of the elongate members are articulated along their length.

10. The shark barrier as claimed in claim 6, wherein at least some of the elongate members are articulated along their length.

11. The shark barrier as claimed in claim 1, wherein at least some of the elongate members are provided by tubes made of a plastics material.

12. The shark barrier as claimed in claim 10, wherein at least some of the elongate members are provided by tubes made of a plastics material.

13. The shark barrier as claimed in claim 11, wherein the tubes are at least partially filled with a buoyant material.

14. The shark barrier as claimed in claim 12, wherein the tubes are at least partially filled with a buoyant material.

15. The shark barrier as claimed in claim 11, wherein the magnets are provided within the plastic tubes.

16. The shark barrier as claimed in claim 14, wherein the magnets are provided within the plastic tubes.

17. The shark barrier as claimed in claim 1, wherein at least some of the elongate members are made of a foamed plastics material.

18. The shark barrier as claimed in claim 17 in which the foamed plastics material is a high density foam.

19. The shark barrier as claimed in claim 1, wherein the one or more magnets are Barium-Ferrite magnets.

20. The shark barrier as claimed in claim 1, wherein the one or more magnets are Barium-Ferrite magnets.

* * * * *